United States Patent [19]

Bloom et al.

[11] Patent Number: 4,649,501

[45] Date of Patent: Mar. 10, 1987

[54] BAND PRINTER CONTROL SYSTEM ARCHITECTURE

[75] Inventors: Robert D. Bloom, Montrose, Pa.; James E. Carrington, Vestal, N.Y.; Richard A. Ide, Sonoita, Ariz.; Patrick J. Traglia, Endwell; Gerald R. Westcott, Endicott, both of N.Y.

[73] Assignee: International Business Machines Corporation, Armonk, N.Y.

[21] Appl. No.: 696,212

[22] Filed: Jan. 29, 1985

[51] Int. Cl.[4] ............................................. G01F 15/40
[52] U.S. Cl. ..................................... 364/519; 346/154
[58] Field of Search ................ 364/514, 518; 346/154; 358/288, 296

[56] References Cited

U.S. PATENT DOCUMENTS 4,491,853 1/1985 Hayashi et al. ................. 346/76 PH Primary Examiner—Arthur G. Evans
Attorney, Agent, or Firm—John S. Gasper

[57] ABSTRACT

A printer control system uses two microprocessors and a print control for operating a plurality of print hammers in synchronism with a revolving type carrier. One microprocessor is a mechanical control processor, the print hammers are operated by a self timed print control system and the other microprocessor is a print control processor that communicates with a host system for receiving print and control data used by the print control and the mechanical control processor for operating the printer. The mechanical control processor monitors a speed selection device such as an operator panel with speed control keys and operates controls for operating drive means for moving the type carrier at selected speeds. The print control processor supplies speed control data from a diskette to the mechanical control processor for control the type carrier speed.

17 Claims, 15 Drawing Figures

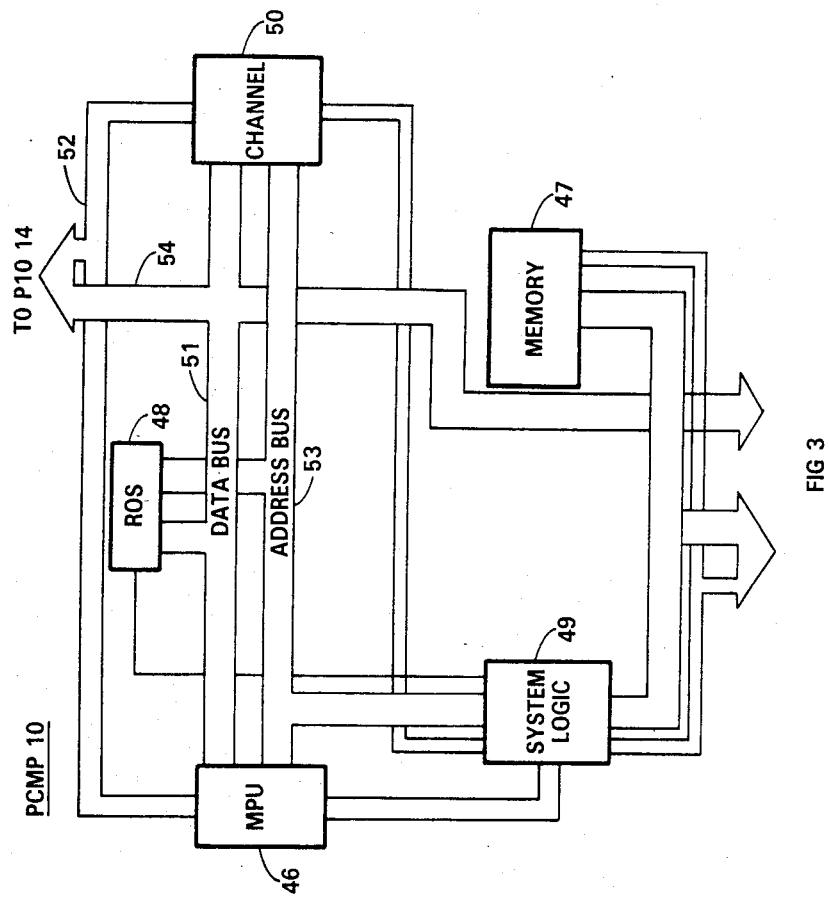

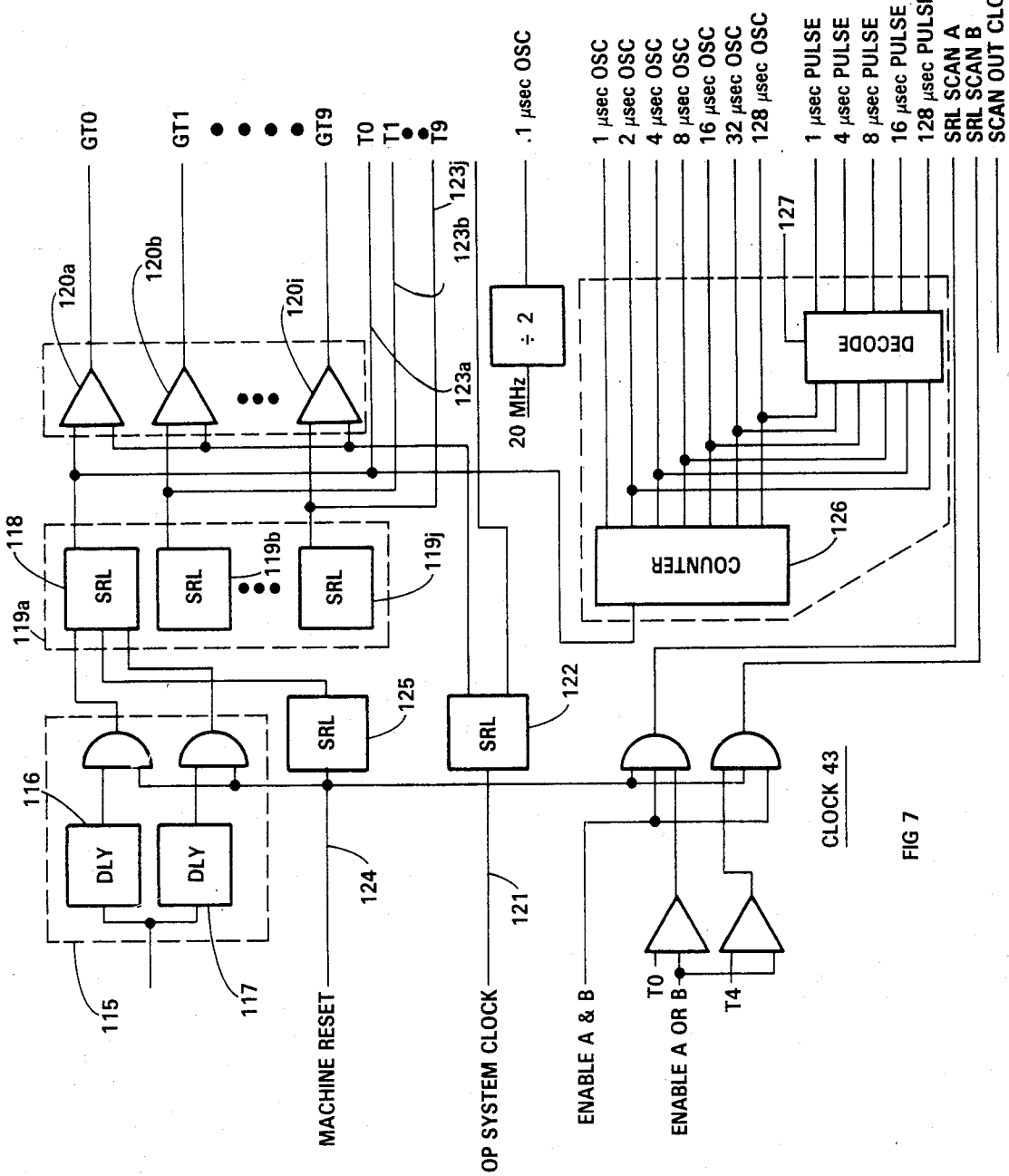

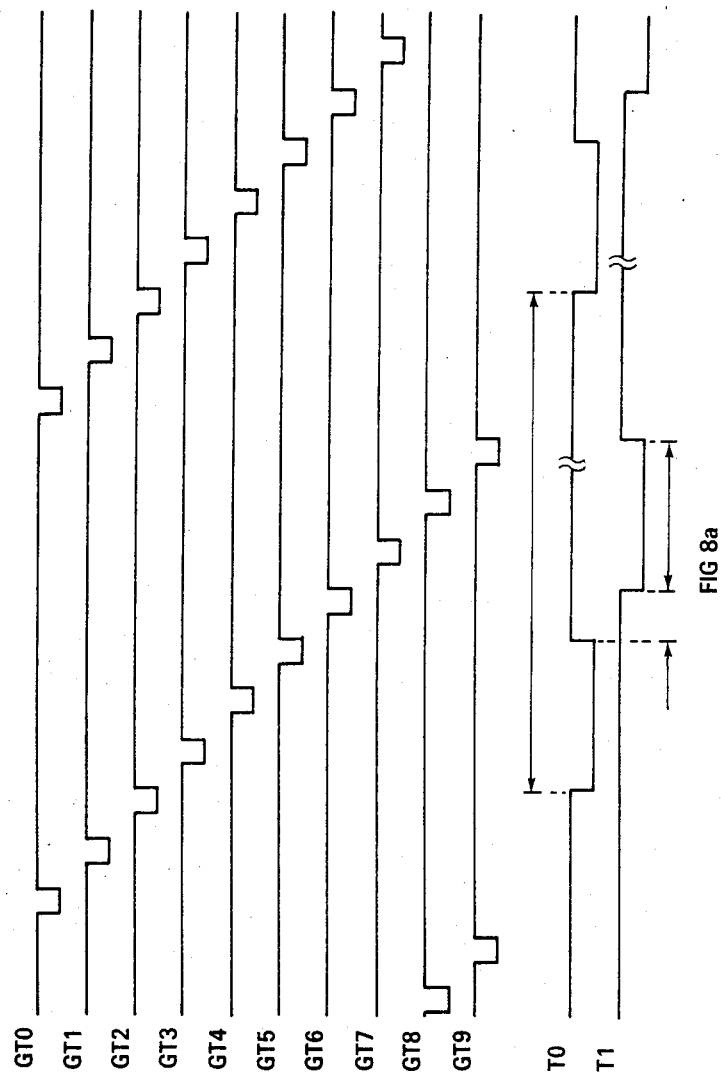

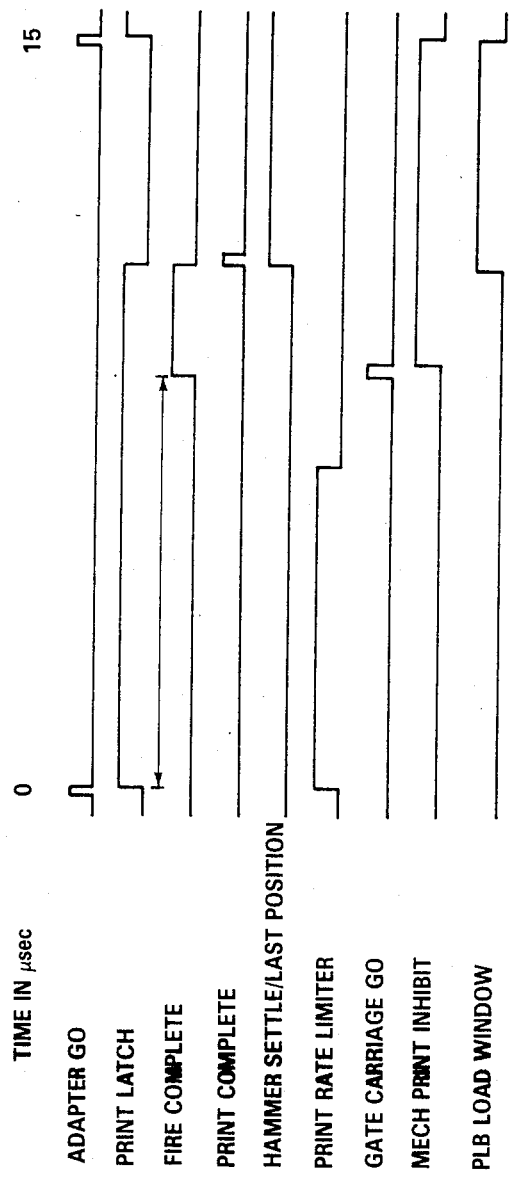

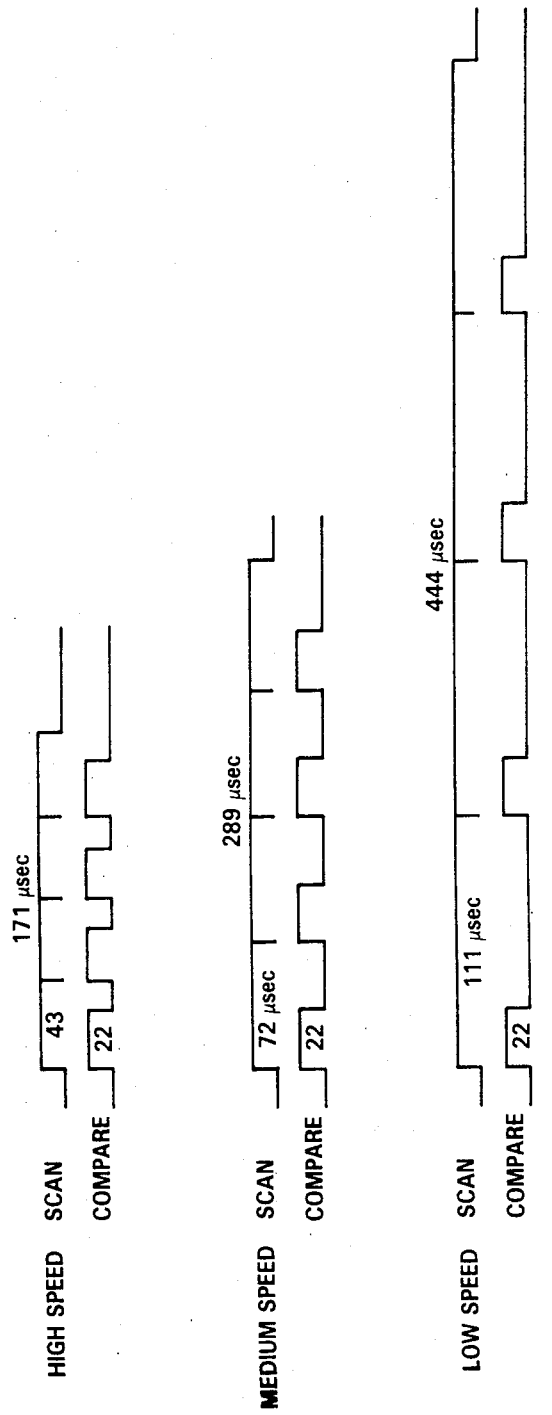

BAND PRINTER CONTROL SYSTEM ARCHITECTURE

This invention relates to printer systems and particularly to a printer system of the type attachable to a host system and which employs microprocessors for communicating with the host system and for operating a high speed on-the-fly printer to print lines of data supplied by the host system.

BACKGROUND OF THE INVENTION

Printer systems have used two microprocessors as the controllers for the various functions of the print mechanism and the print control logic. Generally one microprocessor was the communications microprocessor and the second microprocessor acted to control all functions of the print mechanism. Such a system was inherently slow. For printing at higher print speeds, the printer system was designed so that the microprocessor that communicated with the host system also controlled some or all of the mechanical functions of the printer and the second microprocessor was dedicated to control the printing operation after organizing print data supplied to it into a print algorithm. This arrangement also imposed a limitation on the print speed unless larger more costly microprocessors were used.

In addition to the speed limitations, prior printers could operate at only a single print speed for any given type set. Modification and replacement of the controls and operating mechanisms were required to change the operating speed of the printer.

It is desired to provide a microprocessor directed printer system for a line printer using an endless type band which is capable of operating at very high speeds. It is also desired to provide a printer system having microprocessors and which is capable of operating a high speed on-the-fly line printer at multiple speeds without requiring redesign and replacement of the controls.

BACKGROUND ART

U.S. Pat. No. 4,273,041 issued June 16, 1981 to R. D. Bolcavage, A. J. Ferraro and A. E. Fleek, titled Belt Printer Control Architecture, shows a printer control system using two microprocessors one of which acts as a communications and mechanism control processor and the other of which operates as a print data conversion and print hammer control processor.

U.S. Pat. No. 4,425,844 issued Jan. 17, 1984 to J. E. Carrington, M. D. Hryck, D. W. Skinner, and G. R. Westcott shows a home pulse compensation control for a multiple speed line printer.

U.S. Pat. No. 4,371,948 issued Feb. 1, 1983 to D. P. Chadra shows a control arrangement for attaching a train printer to a host computer where the printer can operate at different speeds with different size type sets. This patent also describes operating either 1100 or 1500 LPM train printers through the use of different slip-in printed circuit cards.

U.S. Pat. No. 4,386,415 issued May 31, 1983 to D. P. Chandra shows a train printer connectable to a host computer via a data link processor which requires suitable hard wired jumpers to be installed for operating different train printers at different print speeds.

U.S. Pat. No. 4,452,136 issued June 5, 1984 to W. W. Boynton and C. J. Weber, titled Printer Subsystem With Dual Cooperating Microprocessors discloses a printer subsystem for connection to a host system that uses two microprocessors one of which communicates with the host system and the other of which operates a dot matrix line printer mechanism.

U.S. Pat. No. 4,096,587 issued June 20, 1978 to C. D. Malkames, titled Data System with Microprocessor Featuring Multiplex Data Transfer and Repeat Cycle Driving Arrangements shows a system for processing data which incorporates a central processing unit and a microprocessor serving as a controller for operating a serial or line printer. The patent discloses a matrix and a belt printer operated by a single microprocessor.

SUMMARY OF THE INVENTION

Basically this invention achieves the above and other objectives by providing a printer control system that uses two microprocessors where one microprocessor is a mechanical control processor, the print hammers are operated by a self timed print control system, and the other micro-processor is a print control processor which communicates with the host system and other external sources for receiving print and control data for operating the printer. The mechanical control processor operates all the mechanical devices including the drive system for revolving the endless type set such as an engraved steel type band at constant speed relative to a row of print hammers, the carriage drive system for feeding paper forms at various speeds in one or more line space increments along a predetermined path relative to the type set and hammers, and a ribbon drive for feeding an ink bearing medium in either of two directions at constant speed between the type set and print hammers as well as other mechanisms. The mechanical control processor also monitors a speed selection device such as an operator panel mounted on the printer and having speed selection means such as speed control keys or buttons and operates controls for operating drive means for moving the type band at the selected speed.

The print control processor receives print, print control and mechanical control data from the host system or other external sources for operating the printer. For that purpose, the printer system includes a bus system whereby the print control processor is coupled to the host and other external data sources, the mechanical control processor and the print control logic. The bus system includes a bus-to-bus adapter (BBA) which is the interface between the print control processor, the print control logic and the mechanical control processor. The bus system includes a read/write storage device or buffer, hereinafter referred to as shared store, which with the BBA serves as the communication link between the print control and mechanical control processors regarding to all operations and status of the various mechanical devices of the printer. The BBA centralizes all the interrupt requests (IR'S) from the mechanical control processor and print control logic and generates a single IR to the print control processor.

The print control comprises read/write storage devices for print, type set and control data which the print control logic uses to control the operation of the print hammers independently of the processors. The print control includes scanning circuits and other logic elements driven by a clock for scanning the read/write buffers to effect selective operation of the print hammers independently of the microprocessors. The print control microprocessor supplies print and control data to the read/write buffers of the print control via the BBA and issues a go or print signal which activates the print controls to scan the read/write buffers and operate the print hammers in synchronism with the movement of the type band. During printing, the print control processor is free to communicate with the host system and monitor the BBA for a print complete IR from the print control logic as well as to receive and respond to other IR's from the mechanical control processor for controlling the various mechanical devices of the printer. Throughout the entire operation of the printer system the print control microprocessor monitors the BBA for status interrupts from the mechanical control microprocessor and the various mechanisms and initiates control commands to the mechanical control microprocessor in response to these IR's.

To operate at multiple speeds, the print control microprocessor supplies a speed control command via BBA and shared store to the mechanical control processor which operates the drive controls in response to the speed control command. Speed changes are made simply by operation of speed selection device, which may be plural keys or buttons which are part of an operator panel mounted on the printer, which is monitored by the mechanical control processor. In response to a key operation, the mechanical control processor sends a speed selection request via an IR through the BBA to the print control processor. A storage device containing the speed control data is accessed by the print control processor in response to the speed selection IR from the BBA. Preferably the storage device comprises a diskette which stores speed control data for transmission by the print control processor via shared store to the mechanical control processor for activating and controlling a variable speed drive whereby the type band can be revolved at any of a plurality of constant speeds.

Thus it can be seen that a printer control system is provided which is capable of printing at very high speeds, is cost effective and is capable of being operated at different speeds without the requirement of making design changes to the apparatus of control elements of the system.

BRIEF DESCRIPTION OF THE DRAWINGS

FIG. 3 is a schematic showing details of the print control microprocessor (PCMP) of FIG. 1;

FIG. 7 is a schematic diagram of the clock for supplying timing pulses for the operation of the print controls of FIG. 1;

FIGS. 8a and 8b are timing charts showing the pulse generations of the clock of FIG. 7;

FIG. 9 is a chart showing the basic timing for operation of the hammer unit by PC 12 shown in FIGS. 1 and 2;

FIG. 10 shows the constant compare rate and variable scan and subscan times.

DETAILED DESCRIPTION OF THE INVENTION

Figure 1:
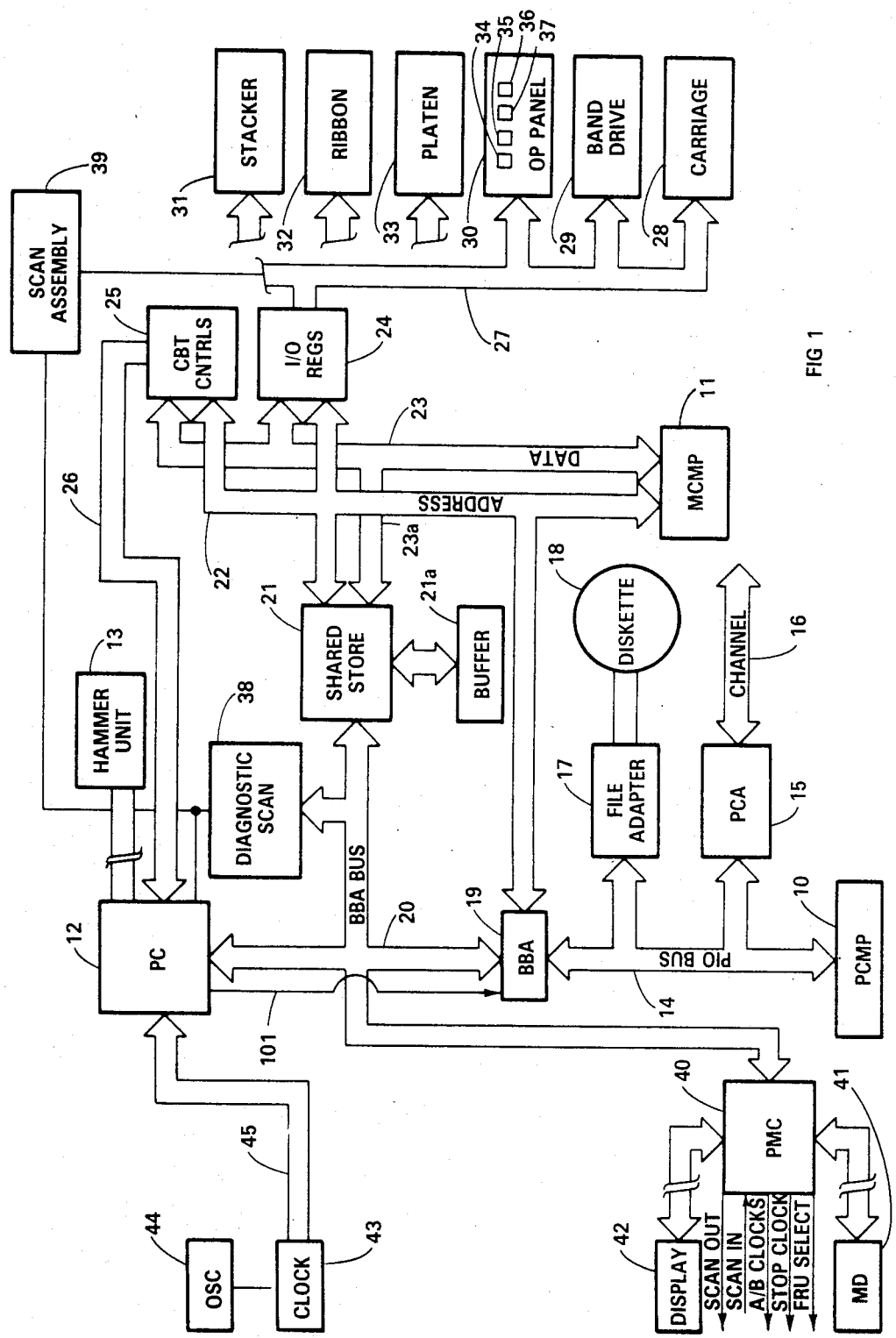
FIG. 1 is a schematic diagram showing the overall configuration of the printer control system architecture in accordance with the invention.

With reference to the drawings and particularly to FIG. 1 the invention is illustrated by way of example as including print control microprocessor (PCMP) 10, mechanical control processor (MCMP) 11 and print control (PC) 12. PCMP 10 is the main processor in the printer control system. MCMP 11 is the controller for the mechanical devices which make up the printer. PC 12 is the logic control portion of the system for selectively operating the various hammers of hammer unit 13.

PCMP 10 receives and communicates all the print and control data used by the MCMP 11 and PC 12 to perform their individual functions. PCMP 10 interfaces directly via programmed input-output (PIO) bus 14 with printer channel adapter 15 for connection via channel 16 to a host system (not shown), with file adapter 17 for connection to diskette 18 and with bus-to-bus adapter (BBA) 19. PCMP 10 has indirect communication with PC 12 through BBA 19 and BBA bus 20 and with MCMP 11 through BBA 19, BBA bus 20 and shared store 21 with buffer 21a. MCMP 11 is coupled by MCMP address bus 22 and data bus 23 to shared store 21 and to mechanical device controls having I/O registers (REGS) 24 and carriage, band and timing (CBT) controls 25. MCMP data bus 23 is also coupled to BBA 19 by bit 1–4 data bus 23a. Synchronizing (PSS, HOME) pulses are supplied by the band timing circuits of CBT controls 25 on bus 26 to PC 12 for synchronizing hammer operation.

Control bus 27 couples I/O REGS 24, CBT Controls 25 and scan assembly 39 to operating mechanisms, sensors and circuitry of carriage 28, band drive 29, op panel 30 and stacker 31, ribbon 32 and platen 33 along with other mechanisms of the printer.

Carriage 28 includes drive motors and circuits plus emitters for generating timing pulses used by CBT 25 for supplying interrupts for operating the motor for moving paper in print line increments relative to the type band. Preferably the motor of carriage 28 is operated at different speeds for forms moves of different lengths but at the same speeds for all printing speeds. Further details of the motor controls can be obtained by reference to copending applications of R. D. Bloom, E. J. Burke and E. T. Kozol entitled Microprocessor Controlled Positioning System, Ser. No. 522,144, filed Aug. 11, 1983; now U.S. Pat. No. 4,591,969 issued on May 27, 1986 and of R. D. Bloom, J. V. Gac, and E. T. Kozol entitled Programmable Servo Motor Speed Control Apparatus, Ser. No. 645,388, filed Aug. 29, 1984 now U.S. Pat. No. 4,570,110 issued Feb. 11, 1986.

Band drive 29 includes a drive motor and circuits with emitters for generating displacement pulses indicating band speed. Band drive 29 might also include sensors and a motor for detecting and correcting for vertical displacements of the type band. Included in the CBT 25 might be the registers used for vertical displacement control. Further details of the displacement control may be seen by reference to copending application of G. Melnyk entitled Type Band Position Detector, Ser. No. 485,523, filed Apr. 15, 1983 now U.S. Pat. No. 4,560,929 issued on Dec. 24, 1985.

Among other things, op panel 30 includes speed selection switches 34–37 for setting and controlling the speed of band drive 29 by MCMP 11.

Stacker 31 might include a stacker motor for controlling the speed of stacking of the platform and sensors for detecting stacker height.

Ribbon 32 would include two drive motors with drive circuits and emitters along with sensors for detecting the end of ribbon for the purpose of reversing direction. Ribbon 32 could also include logic and sensors for skew detection and control.

The system also includes diagnostic scan logic 38 and scan assembly 39 coupled directly to BBA bus 20 for operation through printer maintenance controls (PMC) 40 by maintenance device (MD) 41 and display 42.

Timing circuitry supplying timing pulses for operation of PC 12 for printing at different speed comprises clock 43 driven by oscillator (OSC) 44 and connected to PC 12 by timing bus 45.

As seen in FIG. 3, PCMP 10 comprises MPU 46 with a byte wide arithmetic logic unit and registers with memory 47 which can have 64K or 128K bytes of storage capacity. Communication to PCMP 10 is provided through a standard I/O interface which may operate under program control, called PIO or in cycle steal fashion called CHIO. PCMP 10 also includes ROS 48 which stores the initial program load (IPL) microcode used by system logic 49 and MPU 46 to load the microcode from diskette 18 into memory 47 used to perform the various functions for communicating via channel 50 with BBA 19 and processing and storing print and control data for the system operation as described. PCMP 10 has data bus 51 and control bus 52 for communication with PIO bus 14 and internal address bus 53.

The I/O interface for PCMP 10 consists of I/O data bus 54 of sixteen data lines (0–15) with two parity lines and I/O control bus 52 with sixteen control lines to control transfer of address and command data for CHIO operation with PCA 15 and MPU 46 registers, and channel 50 registers. When MPU 46 is driving the I/O data bus 54, ODD parity is supplied on both bytes even though the address adapter may be using only one byte. Byte-1 (bits 8–15) also contains the IOIR bus lines to MPU 46 during non-IO operations. Bit 8 is used to request a level 0 interrupt (IR), bit 9 a level 1 IR etc. During I/O operations, the direction of the bus is dependent on the operation. All halfword operations are bidirectional. Byte unidirectional operations have the output byte on byte-0, and the input byte on byte-1.

The lines of control bus 52 are defined as follows:

I/O Tag (IO). This line is activated by PCMP 10 whenever a PIO or CHIO transfer is being executed. It is the logical OR of the PCMP 10 and channel 54 I/O lines and informs all adapters that an I/O operation is in progress and to remove their interrupt requests from the low byte (byte-1) of the I/O data bus 30.

Address Tag (TA). This is an output line activated during PIO transfer to indicate to all PIO 14 adapters that an I/O address byte is valid on Byte-0 and that the I/O command byte is valid on Byte-1.

Command Tag (TC). This output line is activated during PIO transfer to indicate to the addressed adapter that the I/O command byte is valid on Byte-0. This line is activated in response to a signal from a printer system adapter in response to its address tag.

Data Tag (TD). This an output line which if I/O tag is inactive, TD indicates to PIO 14 adapter that it is permissible to change state of the IR's. During PIO read transfer, active TD indicates MPU 46 has placed data on the I/O data bus 54 and can now be read. During CHIO operation, an active TD indicates that channel 50 is ready to accept inbound data. During an active TD indicates that channel 50 has placed data in the I/O data bus 54 and can now be read.

Byte Tag (BT). An output line activated whenever one byte of data is being transferred during PIO operation at TD time. Not active during CHIO operation.

Valid Byte -1 (VB1), Halfword (VH). VB1 controls unidirectional PIO and CHIO transfers. VH controls both halfword bidirectional PIO and CHIO transfers. Both are input lines.

Halt (HALT). An output line activated during I/O operation in response to any detected error.

Exception (EXC). This input line is activated by a PIO adapter during

TD handshake. This enables an adapter to inform the PCMP 10 of an unusual adapter condition.

Interrupt Request Removed (IRR). When inactive, this input line indicates that all adapters have placed their IR's on the bus and can be sampled by PCMP 10. IRR is sent by an adapter in recognition of an I/O signal from PCMP 10 having removed all its IR's from byte-1 of the I/O data bus.

Channel Request (CR). CR is an input line activated by an adapter to request a channel transfer of data via a CHIO operation. This is an input.

Channel Grant (CG). This output line is activated to indicate to a requesting adapter that a CHIO transfer may begin.

End of Chain (EOC). Indicates from an adapter that the last piece of data is being transferred.

Not Parity Valid (NPV). Always inactive so that incoming data is always parity checked.

Figure 5A:
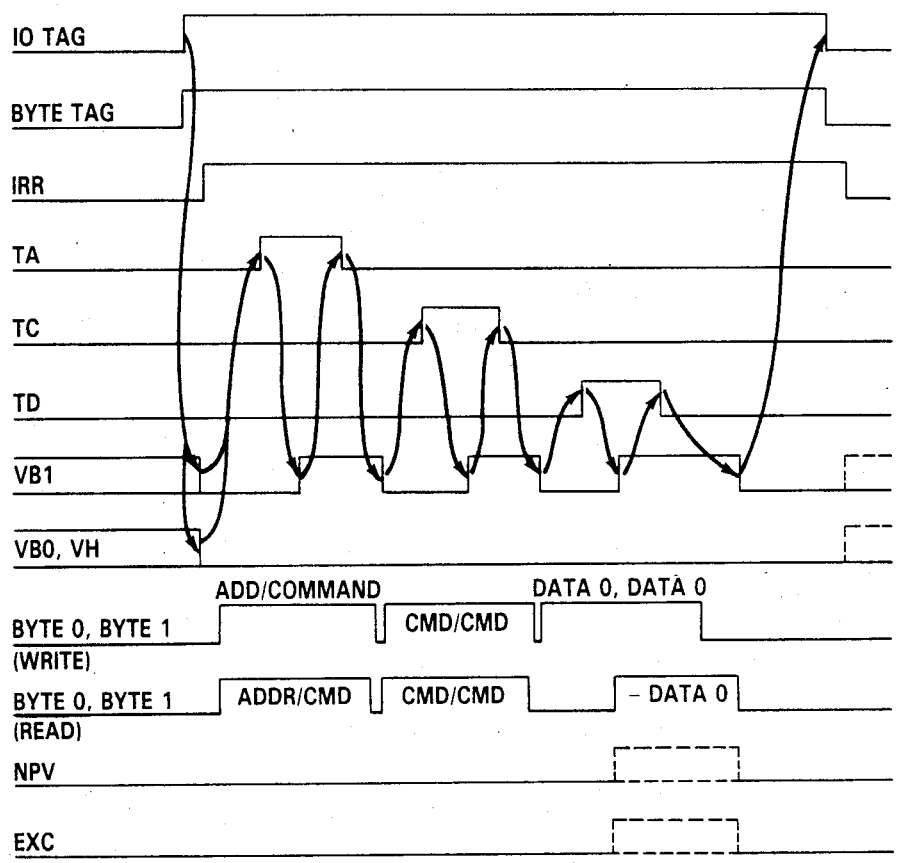
FIGS. 5a and 5b are charts showing the timing for the PIO and CHIO operations respectively of the interface of the PCMP of FIG. 1.
Figure 5B:
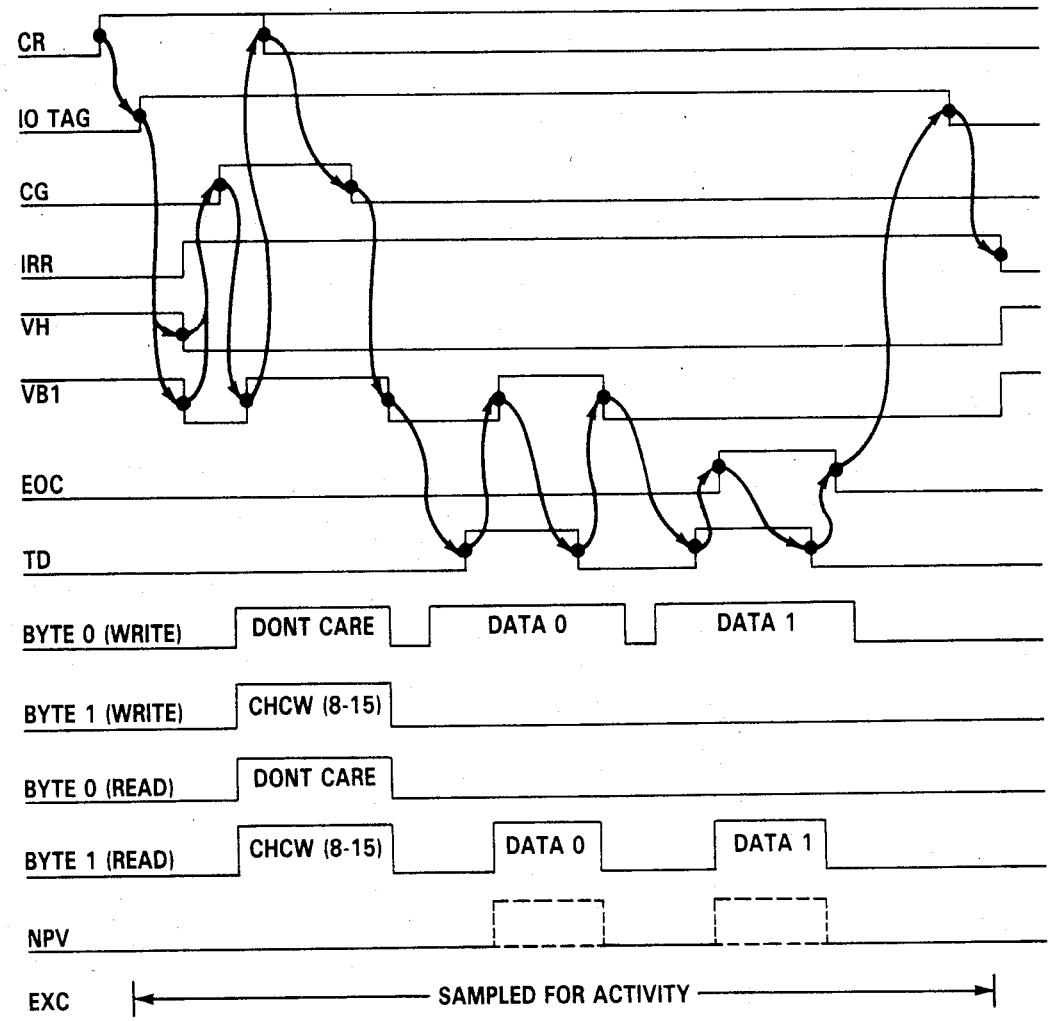

The basic timing for the I/O interface operation with PCMP 10 for the PIO and CHIO operations of PCMP 10 are shown in FIGS. 5a and 5b respectively.

Figure 2:
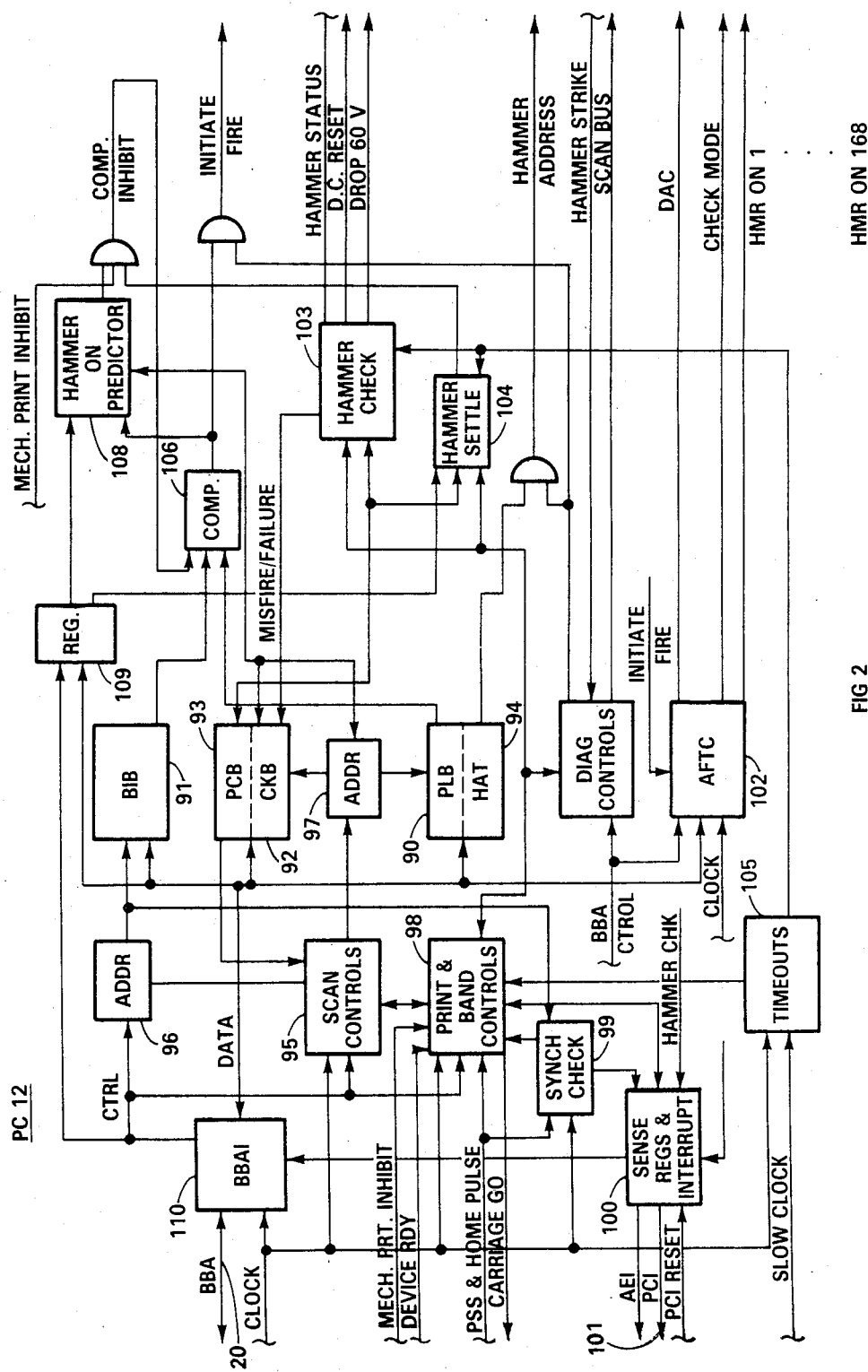
FIG. 2 is a schematic diagram showing details of the print controls portion of FIG. 1.

The following are the Printer Cycle Steal commands generated by PCMP 10:

Cycle Steal Print Line Buffer (PLB). This command causes BBA 19 to request a cycle steal operation to load the PLB. As shown in FIG. 2, the address register 97 is set to the first address position of PLB 90 prior to the cycle steal operation. PLB 90 is loaded for each print line and at initialization. The Cycle Steal control byte is returned as the Cycle Steal Control Word (CSCW). The number of bytes transferred is determined by the Set Cycle Steal Count command which must precede this command.

Cycle Steal Band Image Buffer (BIB). This command causes the adapter to request a cycle steal operation to load the BIB 91. The BIB address start value is loaded in the BIB address register 96 prior to loading BIB 91. BIB 91 is loaded at initialization and for each change of the type set. The cycle steal control byte is returned as CSCW.

Printer Shared Store Commands are Load Shared Store, Read Shared Store, and Reset Shared Store. Load Shared Store causes the data to be loaded into the addresed shared store buffer 21a location. Read Shared Store causes data contained in the addressed location to be transferred to PCMP 10. Reset Shared Store causes the individual data bits to be reset according to the mask provided as data. All other bits are unaffected. This command can be used for controls between PCMP 10 and MCMP 11 where the modification of shared store 20 by the PIO channel must be delayed until MCMP 11 has completed a read/write operation. A specific method for communication between PCMP 10 and MCMP 11 using shared store 21 can be seen by reference to the article entitled Processor to Processor Communication Method published in the IBM Technical Disclosure Bulletin, Vol. 26 No. 11, April 1984 at pp. 6145–6146.

Diskette 18 is a disk drive mounted preferably as an integral part of the printer. The recording medium is a removable floppy magnetic disk with data recorded on a single side. The data is formatted with 256 bytes per sector, fifteen sectors per track, for a total diskette capacity of 284K bytes. Data stored in diskette 18 comprises data used by PC 12 for operating the print hammers and for use by MCMP 11 for operating the mechanical devices. Included in the data stored in diskette 18 are the print hammer flight time data, type set data when interchanging type bands and speed control data for operating the type set at different speeds. Basically the hammer flight data and type set data are read from diskette 18 by PCMP 10 operating through adapter 17 and stored in its memory registers for transmission via PIO bus 14 through BBA 19 and BBA bus 20 for storage in the various read/write buffers and registers of PC 12. Speed control data is similarly read from diskette 18 by PCMP 10 for transmission via BBA 19 and BBA bus 20 to shared store 21 for use by MCMP 11 for operating the type set drive at a selected speed. Diskette 18 also contains the microprograms for initial microprogram load of PCMP 10 and MCMP 11 by PCMP 10 operating in accordance a bootstrap routine in its own ROS 58.

Print channel adapter (PCA) 15 contains the hardware necessary to receive communications from the host system via channel 16, pass the data to/from the storage of PCMP 10, respond to commands from PCMP 10 and send status information to channel 16 to complete communication. Among the communications received from the host system might include commands for setting and changing speed of the type set drive mechanism.

Shared store 21 (with buffer) is a read/write buffer with circuitry to allow it to be shared between PCMP 10 via BBA 19 and the memory bus of MCMP 11. This provides the communications path so that the two microprocessors can pass data back and forth in an asynchronous manner. To accomplish this in an orderly manner, shared store 21 allocates itself alternately to BBA 19 and MCMP 11. Each allocation time is sufficient for one byte of data to be fetched or stored. In the preferred form, the memory bus of MCMP 11 is a synchronous, non-interlocked data mechanism. Consequently the timings of the shared store 21 are synchronized with timing of the MCMP 11 and deal asynchronously with BBA 19 via handshaking signals.

BBA 19 is the interface between PCMP 10, PC 12 and MCMP 11. BBA 19 handles the handshaking between PCMP 10 and its controlled subadapters, command decodes, and bookkeeping for print control cycle steal operations and shared store data transfer. BBA 19 centralizes all the interrupt requests from various associated subadapters and devices to generate one single interrupt request to PCMP 10. In conjunction with shared store 21, BBA 19 serves as the communication link between the two microprocessors PCMP 10 and MCMP 11. MCMP 11 brings the status of the printer mechanical devices 28–33 to the attention of PCMP 10 by having BBA 19 generate an interrupt. In the preferred embodiment the interrupt is a level 3 interrupt and would include an interrupt for effecting changes in operating speed of the band drive 29 for example. PCMP 10 on the other hand can have BBA 19 stop or reset the MCMP 11 during testing.

Figure 4A:
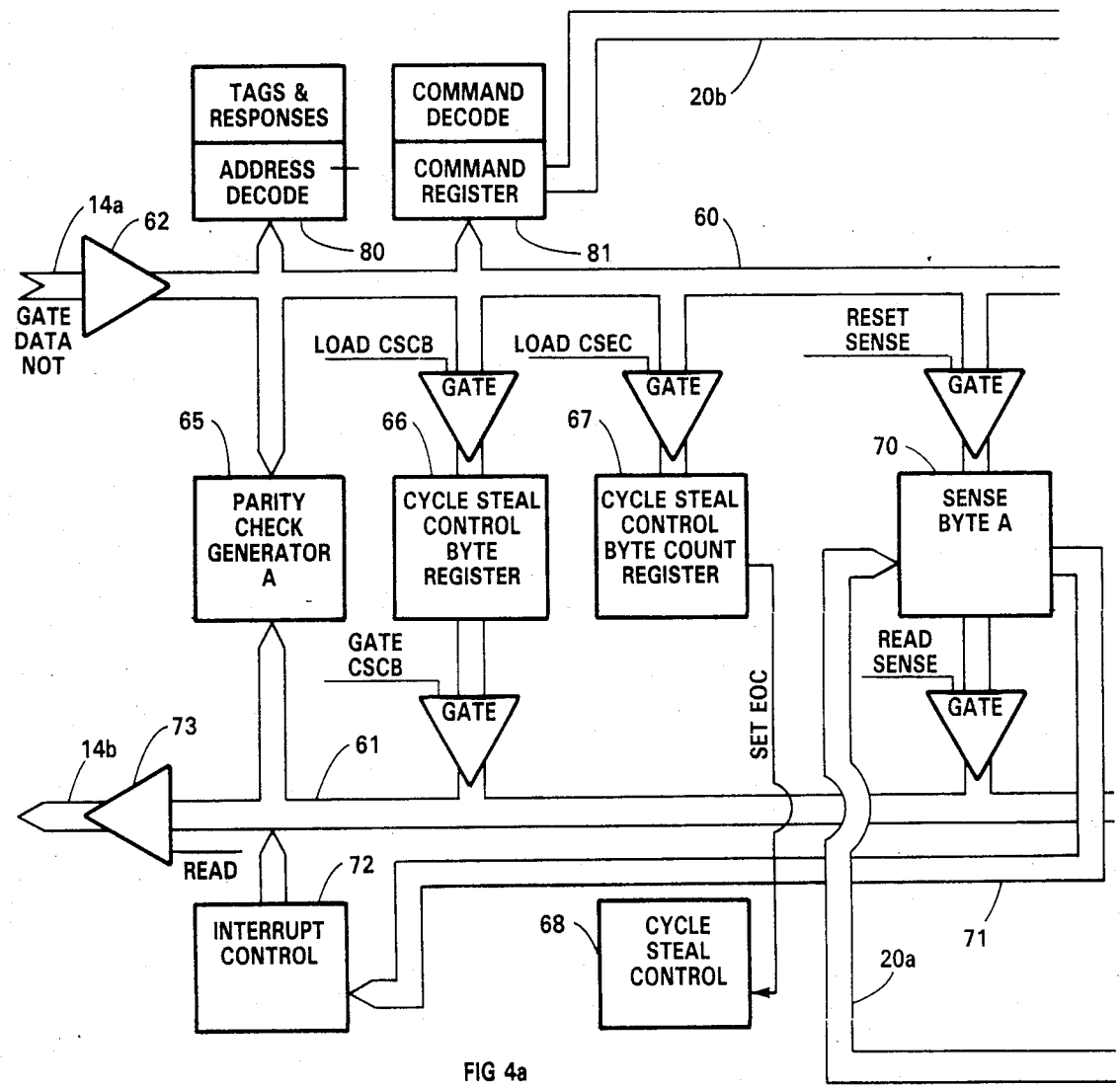
FIGS. 4a and 4b are schematic diagrams showing some details of the bus-to-bus adapter (BBA) of FIG. 1.

As seen in FIGS. 4a and b, BBA 19 comprises source bus 60 and destination bus 61. BBA 19 also includes the following operating logic units:

Parity Check/Generator A(PCGA) 65. Contains the logic for parity checking and generating parity indicators relative to data received on lines 14a of PIO bus 14 from PCMP 10.

Cycle Steal Control Byte Register (CSCBR) 66. Stores the cycle steal (CS) control byte received from source bus 60 in response to a Load CSCB command from PCMP 10.

Cycle Steal Control Byte Count Register (CSCBCR) 67. Stores the CS control byte received from source bus 60 in response to a Load CSCB command from PCMP 10 and generates a SET EOC signal for terminating operation by Cycle Steal control 68.

Cycle Steal Control (CSC) 68. Contains the logic for performing the operations of generating channel request to PCMP 10, performing the cycle steal operation and sending End-of-Chain (EOC) to PCMP 10 upon completion of the data transfer.

Basic Status Register (BSR) 69. Stores status information received from MCMP 11 relative to operation of the mechanical devices 28–33 on bus 24. Also stores a Print Complete Interrupt (PCI) online 101 from PC 12 for communication of interrupt and data information via destination bus 61 in response to a Read Stat command from PCMP 10.

Sense Byte A Register (SBAA) 70. Stores invalid command and error data from PC 12 and shared store 21 subadapters. Sends a level 3 interrupt on bus 71 to interrupt control 72 for communication via destination bus 61 and drivers 73 to PCMP 10 on lines 14b of PIO bus 14.

RCW Data Register (RCWDR) 74. Stores RCW data from source bus 60 or destination bus 61 for transmission in response to RCW control 75 to PCMP 10, shared store 21 or PC 12 in response to commands from PCMP 10.

RCW Control (RCWC) 75. Controls RCWDR 74 to effect the data transfer between shared store 21 and PCMP 10 during a read-control-write operation.

Parity Check/Generator B (PCGB) 76. This is logic for parity checking and generating parity indicators for data received from shared store 21 or PC 12 on BBA bus 20 for communication of commands and data through BBA 19 to PCMP 10.

Print Control shared Store Select (PCSSS) 79. Contains the logic for decoding shared store commands issued by PCMP 10 and selecting gating data and commands to the shared store 21.

Tags & Responses Address Decode (TRAD) 80. Contains the logic for receiving tags and addresses and generating responses and decoding the addresses of commands and data from PCMP 10 for communication through BBA 19 to shared store 21 and PC 12.

Command Decode Command Register (CDCR) 81. Stores and decodes command data received via lines 14a of PIO bus 14 from PCMP 10 for transmission on BBA address and command bus 20b to BBA bus 20.

Diagnostic Register (DR) 82. Stores data from shared store 21 during diagnostic operations for transmission to PMC 40 for processing by MD 41 and display 42.

Figure 4B:
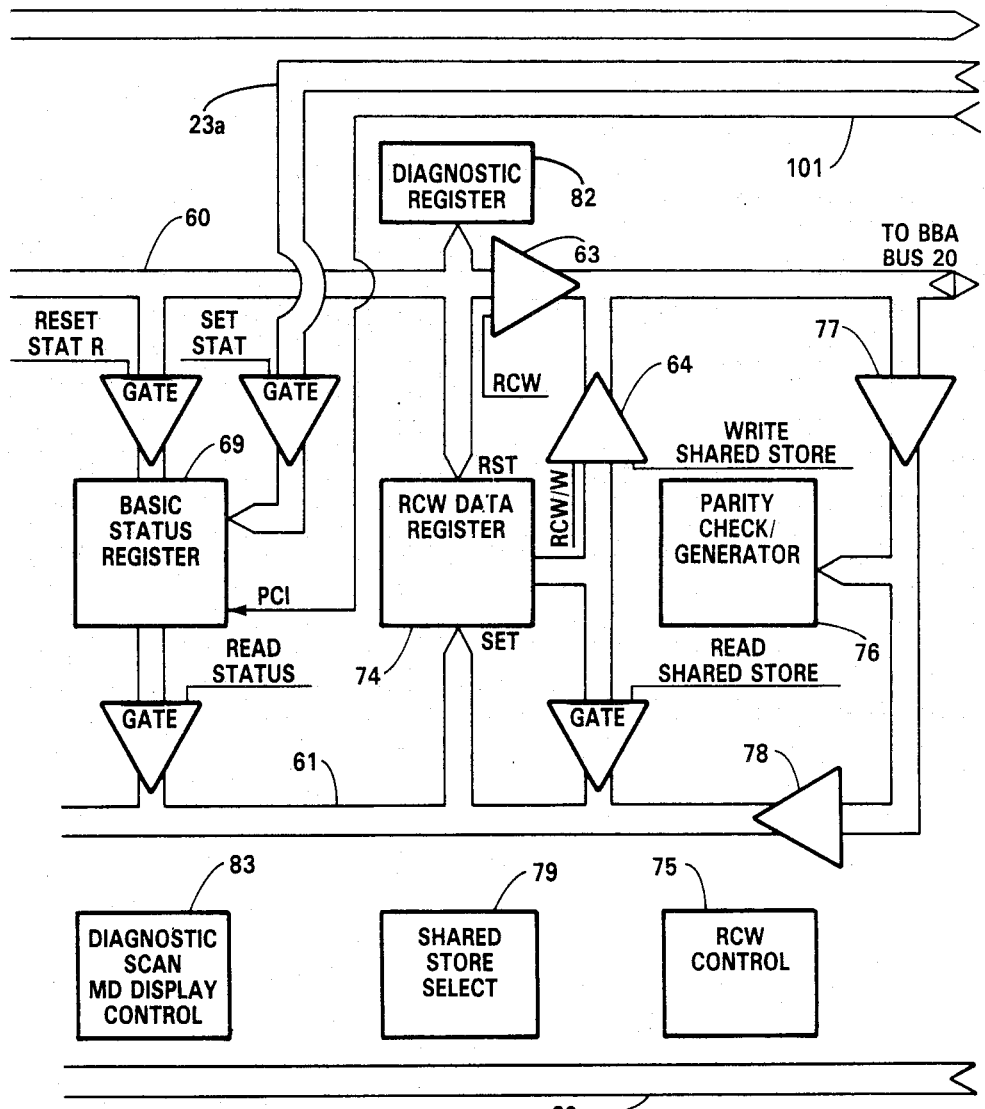

Source bus 60 receives data and commands from the output lines 14a of PIO bus 14 via receiver circuits 62 and supplies data via output driver circuits 63 and 64 to BBA bus 20. Address and command data received on source bus 60 is supplied through TRAD 80 and CDCR 81 onto address and command bus 20a to BBA bus 20 to shared store 21 PC 12. Destination bus 61 receives data and status information from PC 12 and shared store 21 from BBA bus 20 through receiver circuits 77 to PCGRB 76, receiver circuits 78 and supplies interrupts and data via output drivers 73 to the input lines 14b of PIO bus 14 to the interface of PCMP 10. Status information from MCMP 11 is supplied on data bus 24 to Basic Status register 69 which generates IR's. IR's from register 69 are gated onto destination by a Read Status command for communication to PCMP 10 via input lines 14b of PIO bus 14 through output drivers 73. A Print Complete signal is received from PC 12 on line 101 to the Set PCI input of BST 71. An IR from BSR 71 is gated by a Read Status command from PCMP 10 onto destination bus 61 for transmission by drivers 73 to PCMP 10 via lines 14b of PIO bus 14. In response to this IR, PCMP 10 sends address and command data and print data via BBA 19 onto bus 20 to PC 12. For changing the operating speed of the band drive 30, PCMP 10 sends appropriate address and command data via BBA 19 to shared store 21 for use by MCMP 11 for setting band drive 30 to operate at the selected speed. Other data transfers from PCMP 10 through BBA 19 to PC 12 and shared store 21 for use by MCMP 11 are readily apparent from FIGS. 4a and 4b.

In accordance with this invention, changes in type band speed are effective by operations of selection means such as keys 34–37 associated with op panel 30. Specific keys may be designated Stop, Low, Medium, High and Start. The operation of these keys result in status data being sent by MCMP 11 through shared store 21 on BBA bus 20 to source bus 60 of BBA 19 which generates an IR for a speed change to PCMP 10. In response to this IR, PCMP 10 retrieves speed change data from diskette 18 and relays it through BBA 19 to shared store 21. MCMP 11 reads the speed selection data from shared store 21 and in accordance with its own microcode sends a command via a register in I/O register 24 which is decoded to set the band drive 29 at the selected speed. While the procedure can be done in different ways, the preferred sequence is for a Stop key to be operated thereby generating a level 5 interrupt to MCMP 11. MCMP 11 sends a stop command via I/O registers 24 which is decoded to a control signal for stopping band drive 29. MCMP 11 at the next poll of op panel 30 looks for a speed selection signal from the selection keys 34–37. If present, MCMP 11 sends a speed selection request to share store 21 for transmission to PCMP 10 via BBA bus 20 and BBA 19 which sends an IR on PIO bus 14. Speed control data retrieved by PCMP 10 from diskette 18 is sent to shared store 21 and read therefrom by MCMP 11 for setting band drive 29 to operate at the new speed as previously described. In addition to the speed control values sent to MCMP 11, PCMP 10 also sends control data stored on diskette 18 to various control registers in PC 12 for controlling the operation of PC 12 in accordance with the new type band speed.

As previously mentioned, PC 12 comprises the electronic storage and logic for operating the hammer unit 13 in synchronism with the movement of a type carrier such as a type band. In the preferred manner in which the invention is practiced, hammer unit 13 comprises a row of individually operable electromagnetic print hammers where the pitch of the hammers and pitch of the type are different so that PC 12 is designed to control the operations of the hammers in accordance with the well know scan/subscan sequence of operations. The elements of PC 12, as shown in FIG. 2 include the following:

Print Line Buffer (PLB) 90. This is a read/write storage buffer for storing a line of data to be printed. PLB 90 is loaded by PCMP 10 through BBA 19 initially on command from the host system and thereafter in response to a PCI signal from PC 12.

Band Image Buffer (BIB) 91. This read/write buffer stores character data representing the characters on the type band in the sequence they are arranged thereon. BIB 91 is loaded by PCMP 10 via BBA 19 during initializiation and whenever a type band is changed. Character data for different type bands are stored on diskette 18 for retrieval by PCMP 10 if, at band-up-to-speed time, a type band different than the last band image loaded is detected.

Check Buffer (CKB) 92. This read/write buffer stores various check bits generated by the hammer check logic of PC 12 and is the basic element for recording hammer error and operation data used for error correction and print complete operations.

Print Control Buffer (PCB) 93. This read/write buffer stores data provided by PCMP 10 from diskette 18 for controlling the scanning operation of BIB 91. Hammer check and settling control data is also stored in this buffer.

Hammer Address Table (HAT) 94. This read/write buffer stores coded data representing the addresses of the print hammers of hammer unit 13. HAT 94 is loaded during initialization by PCMP 10 with data stored on diskette 18.

Scan Controls 95. This is the logic circuitry for operating address circuits 96 for addressing BIB 91 and address circuits 97 for addressing PLB 90, CKB 92, PCB 93 and HAT 94 in subscan sequence.

Print and Band Controls (PBC) 98. This logic circuitry functions for synchronizing scan controls 95 in response to timing (PSS) and HOME pulses received from the type band. PBC 98 also coacts with synch check logic 99 and sense interrupt logic 100 for communicating with MCMP 11 regarding the tracking condition of the type band.

Automatic Flight Time Controls (AFTC) 102. Contains the registers for storing the time delay and hammer on time data and the control logic for timing the operation of the print hammers of hammer unit 13. Time delay and hammer on time data is supplied to AFTC 102 by PCMP 10 from data stored on diskette 18. Time delay and hammer on time data is loaded by PCMP 10 during initialization.

Hammer Check 103. This contains the logic for checking the operation of the print hammers and produces various operation and error bits for storing in CKB 92 to be used for generating the Print Complete signal on line 101 and/or error signals indicative of misfire or failure of the hammers.

Hammer Settling Controls 104. This is the logic for timing the operation of the hammers and indicating when hammers have settled in their rest position.

Compare (COMP) 106. This circuitry operates for comparing type character data from BIB 91 and print character data from PLB 90 by operation of address circuits 96 and 97 by scan control 95. COMP 106 generates "Initiate Fire" signals when an equal compare occurs which activates AFTC 102 to time and fire the hammers as enabled by address signals from HAT 94. "Initiate Fire" signals are also applied to Hammer On Predictor 108 which limits the number of print hammers turned on simultaneously as determined by max count stored in register 109 by PCMP 10 from data contained in diskette 18.

BBA Interface (BBAI) 110. This is the adapter (also subadapter) logic for PC 12. BBAI 110 functions as the interface for receipt and transmission of all print data and control data stored in PLB 90, BIB 91, CKB 92, PCB 93, HAT 94 and the various control registers of AFTC 102, PBC 98, Hammer Check 103, Hammer On Predictor 108 and max count data register 109.

Printing starts by PCMP 10 sending a Print Go signal to PC 12 upon completion of loading a line of print data through BBAI 110 into PLB 90. This enables scan control 95 as previously described. During printing, print data is compared with band image data corresponding with type characters on the type band that line up with the print positions being addressed. If an equal compare occurs and the enabled bit is on in CKB 92, an "initiate fire" signal, along with the hammer address is sent to AFTC 102 and hammer check 103 sets a fired bit and resets the enabled bit in CKB 92. In the meantime, a delay fire counter in AFTC 102 set in accordance with data supplied by PCMP 10 for the associated hammer during the start up routine of the system, starts to increment in response to clock pulses supplied by clock 43 until the programmed delay count is reached. At this time a hammer latch is set, causing the hammer to fire. After the hammer is fired, incrementing of the delay counter continues until a programmable reset value stored in a terminate fire register in AFTC 102 is reached. At this time, the hammer fire latch is reset, a handled bit is set and the fired bit reset in the CKB 92. A Start Carriage signal is sent to MCMP 11 to start carriage motion when all hammers have been fired.

Print control 12 continues scanning the buffers until all characters to be printed have been printed as indicated by the "handled" bits in the CKB 92. At this time print operation is terminated and a PCI signal sent by SRI 100 on line 101 to BBA 19 resulting in a print complete interrupt being sent to PCMP 10 which indicates all hammer drivers have been turned off and checking completed.

More specific information regarding the operation of PC 12 may be seen by reference to U.S. Pat. Nos. 4,440,079 issued Apr. 3, 1984 to D. A. Dayger et al entitled Control System For Timing Hammers of Impact Printers; 4,457,229 issued July 3, 1984 to J. E. Carrington et al entitled Scan Correction For a Line Printer Having Multi-Pitch Type Carriers; 4,425,844 issued Jan. 17, 1984 to J. E. Carrington et al entitled Home Pulse Compensation For Multiple Speed Line Printers; 4,376,411 issued Mar. 15, 1983 to J. E. Carrington et al entitled Print Hammer Limit Control and the following articles in the IBM Technical Disclosure Bulletin: Prioritized Timeout Multiplexer Control, Vol. 26 No. 4 September 1983, pp. 1952-1953; Print Hammer Settle Control, Vol. 24 No. 4 September 1981, pp. 2131-2132; Print Hammer Error Checking, Vol. 24 No. 9 February 1982, pp. 4703-4704. The basic timing for PC 12 operation is seen in FIG. 9.

The main timing control for internal communications of the printer is provided by clock 43. It generates the required timing pulses as needed to enable the PC 12 to function independently of microprocessor involvement to control the operation of the individual hammers of hammer unit 13 to print lines of data supplied by the host system. Oscillator 44, which may be a 20 MHZ crystal oscillator is used in the front end of the clock. In its preferred form, clock 43 contains ten output lines, which are non-overlapping in each clock cycle. Clock 43 functions to supply timing pulses throughout PC 12 including scan controls 95, AFTC 102, hammer check 103 and hammer on predictor 108.

Figure 8B:
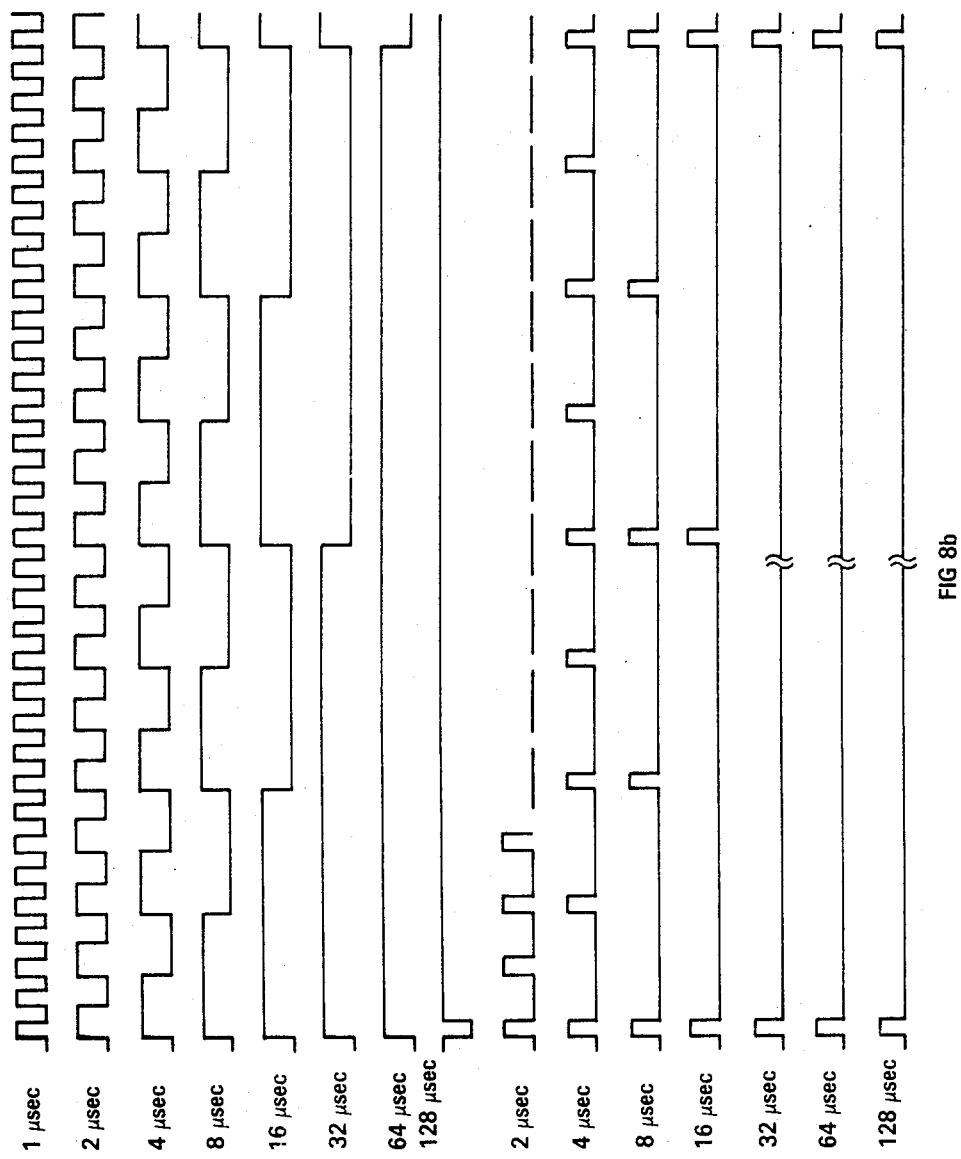

As seen in FIG. 7, clock 43 comprises phase splitter 115 comprising delay (DLY) elements 116 and 117 which supply phase 1 and phase 2 signals to shift register 118 containing ten SRL's 119a-j which have outputs connected through AND circuits 120a-j. Non-overlapped pulses are gated through AND circuits 120a-j by Op System Clock command from PCMP 10 on line 121 to SRL 122 to produce gated clock pulses GT0, GT1-GT9 for timing the control except for BBA 19 and PMC 10. Non-gated pulses T0, T1-T9 are provided on lines 123a, 123b,-123j for timing the operation of BBA 19 and PCMP 10. The output of SRL 119a is connected to an 8-bit counter 126 for producing a third set of timing pulses 1usec osc, 2 usec osc, - 128 usec osc. A fourth set of timing pulses 1usec, 4 usec, 8 usec, 16 usec and 128 usec are produced by decode 127 connected to the bits 2-7 outputs of counter 126. A machine reset command on line 124 to SRL 125 resets register at the beginning of start up to provide clock synchronism. Various sets of pulses from clock 43 are Anded to obtain timing pulses for controlling the scan controls and other functions of PC 12. The sequences of the various sets of timing pulses of clock 43 are seen in FIGS. 8a & b.

In accordance with this invention, the compares of the character data stored in PLB 90 and type data store in BIB 91 for printing are performed in the same interval or clock rate for all speeds determined by the fastest scan or subscan pulse rate required for printing at the high speed and subtracting a safety factor to allow for type band velocity variations and dividing this value by the number of print positions that must be optioned by scan controls 95 during a subscan interval.

As shown in FIG. 10, the clock rate (e.g. 22 usec) which times the subscan options of the buffers and hammers remains constant for each speed while the scan and subscan intervals increase from the high to the low speed. This arrangement provides a flexible clocking arrangement which permits printer operation at different speeds without changing timing circuitry or other components and eliminates the need for having a different clock rate for each speed.

Figure 6:
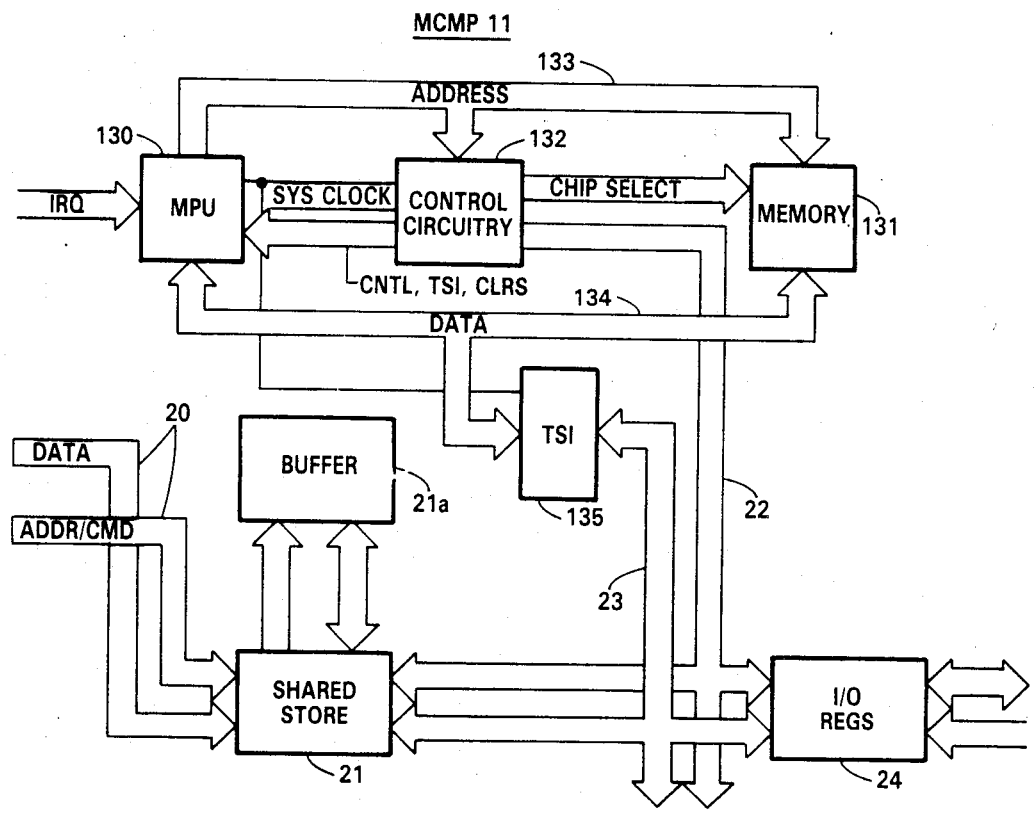
FIG. 6 is a detail schematic of the mechanical control microprocessor (MCMP) and a portion of the mechanical controls of FIG. 1.

MCMP 11 serves as a control center for all the essentially mechanical functions of the printer. Coordination of all printer action is arranged in PCMP 10, which assigns mechanical tasks by entering codes in shared memory 21. MCMP 11 interrogates shared memory 21 for action and parameter information which it uses to control paper feeding, paper stacking, type drive and speed control, ribbon drive speed, and operator panel switches. As seen in FIG. 6, MCMP 11 comprises processor portion MPU 130, memory 131, and control circuitry interconnected by address bus 133 and data bus 134. Control circuitry 132 provides the necessary interface between MCMP 11 and the mechanical devices 28-33 that it communicates with. Included in the MCMP control circuitry 132 are the following; 1. Address Decoding controls—this portion of the MCMP 11 controls contains the necessary logic to access CBT 25, I/O Regs 24 for controlling carriage 28, band drive 29, op panel 30 etc., plus shared store 21 and its own main memory 131 which stores data from shared store 21 or buffer 21a for processing. 2. Time Status Interrupt (TSI) 135. This is a free running timer that generates a TSI at regular and frequent intervals, e.g. 5 milliseconds. TSI 135 allows MCMP 11 to monitor the state of the switches, for example switches operated by keys 34–37 of op panel 30, which as discussed initiate the start and speed changes of the band drive 29, and relays this information to PCMP 10 via shared store 21.

The CBT 25 controls the mechanism for feeding paper on which printing occurs. The amount of carriage movement is determined by PCMP 10 based upon a program or operation of keys on the operator panel. The program can select single, double or triple line spacing, space suppress and skipping at six or eight or ten lines per inch. Spacing can be done in increments of 1/120th of an inch. Carriage movement is controlled by MCMP 11 and CBT 25 by comparing the feedback pulses from the carriage 28 motor with the amount required in the move. Paper speed is controlled by MCMP 11 and timers giving motor forward drive pulses in time relation with the feedback pulses. Paper motion is stopped after receiving enough feedback count pulses by applying reverse drive pulses to the feed motor in timed relation with the feedback pulses. When no motion is required, such as during print time, the feedback lines are used to detect drift motion and MCMP 11 will give short correcting drive pulses for forward and reverse motion, as needed to maintain proper forms registration.

Stacker controls 31 will provide the stacker entrance drive roll motor with the correct speed. MCMP 11 keeps track of the forms speed into the stacker area and the amount of forms to maintain stacking. MCMP 11 governs long forms moves by carriage 28 to prevent stacker overrun. MCMP 11 in conjunction with PCMP 10 monitors stacker tray position.

MCMP 11 controls operation of the motion of the ink ribbon through CBT 25 and I/O regs 24. Included in the operations that are controlled by MCMP 11 are ribbon advance and reversal, skew correction and idle.

MCMP 11 controls operation of the band drive through CBT 25 and I/O Regs 24. In accordance with a principal feature of this invention, MCMP 11, is programmed to control the speed selection of the type band and regulate its speed essentially constant at any selected speed. CBT 25 provides signals to operate band drive 29 motor at different preselected speeds such as 780, 460, and 300 inches per second. MCMP 11 also monitors and controls a second motor in band drive 29 to maintain vertical alignment in response to alignment signals. MCMP 11 further functions to control band timing home and band identification pulses by monitoring pulses generated by band emitters.

The push buttons and indicators contained on the op panel 30 of the printer are monitored or controlled by MCMP 11 through the use of read or write commands to I/O registers 24. MCMP 11 monitors the state of keys 34–37 by means of a free running five msec interrupt timer TSI 135. In response to operation of the op panel 30 key by a machine operator to effect a speed change of the machine, MCMP 11 stores a control word in shared store 21 which produces a level 3 interrupt through BBA 19 to PCMP. PCMP 10 then reads the diskette 18 and sends the appropriate command to shared store 21 for use by MCMP 11 for changing speeds of the band drive 29.

Microcode. PCMP 10 operates only in response to interrupt requests. If no requests are outstanding, the system will enter a wait state. There are eight levels of interrupts, 0-7, where is 0 is highest and 7 is lowest. Requests for service are sampled at the beginning of an instruction. If allowed, an interrupt will occur at the end of execution of that instruction. If a higher level request occurs, a new level is selected and the next microinstruction is obtained. The assignment of interrupt levels is as follows: 0—Machine check/program check; 1—Maintenance control adapter code; 2—Channel adapter code; 3—Print adapter code; 4—Not used; 5—Diskette adapter code; 6—Control code (supervisor); 7—Functional control modules.

Control Code. The control code allows five software interfaces for CAC microcode (e.g., one on each interrupt level 1-5). This allows five different common adapter code (CAC) modules to be operating in a time shared (multiplexed) mode with the control program. The machine uses four: viz. PCA, PMC, Diskette, and Printer. See FIG. 11b The control code allows up to eight separate function code tasks to be operating in a time shared priority basis (multitasking). Since all the function code tasks operate on Interrupt Level 7, the job of maintaining a priority service queue mechanism and saving and restoring the PSW's on task priority changes must be done in the control microcode.

Figure 11A:
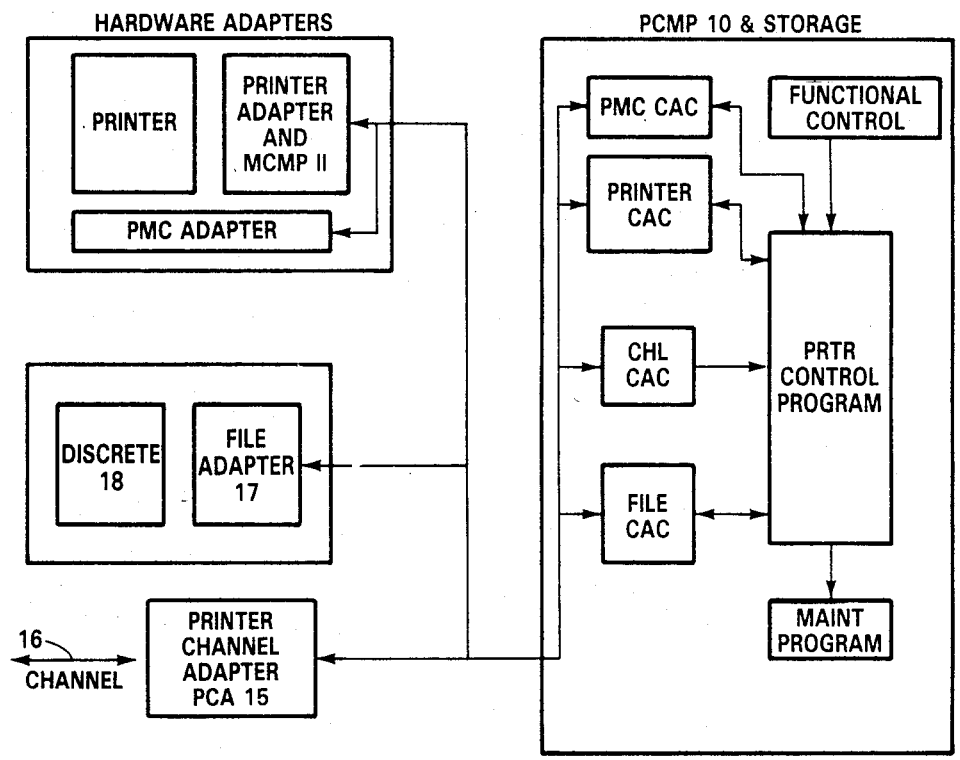
FIGS. 11a and 11b are charts showing the basic organization of microcode used in the system of FIG. 1.
Figure 11B:
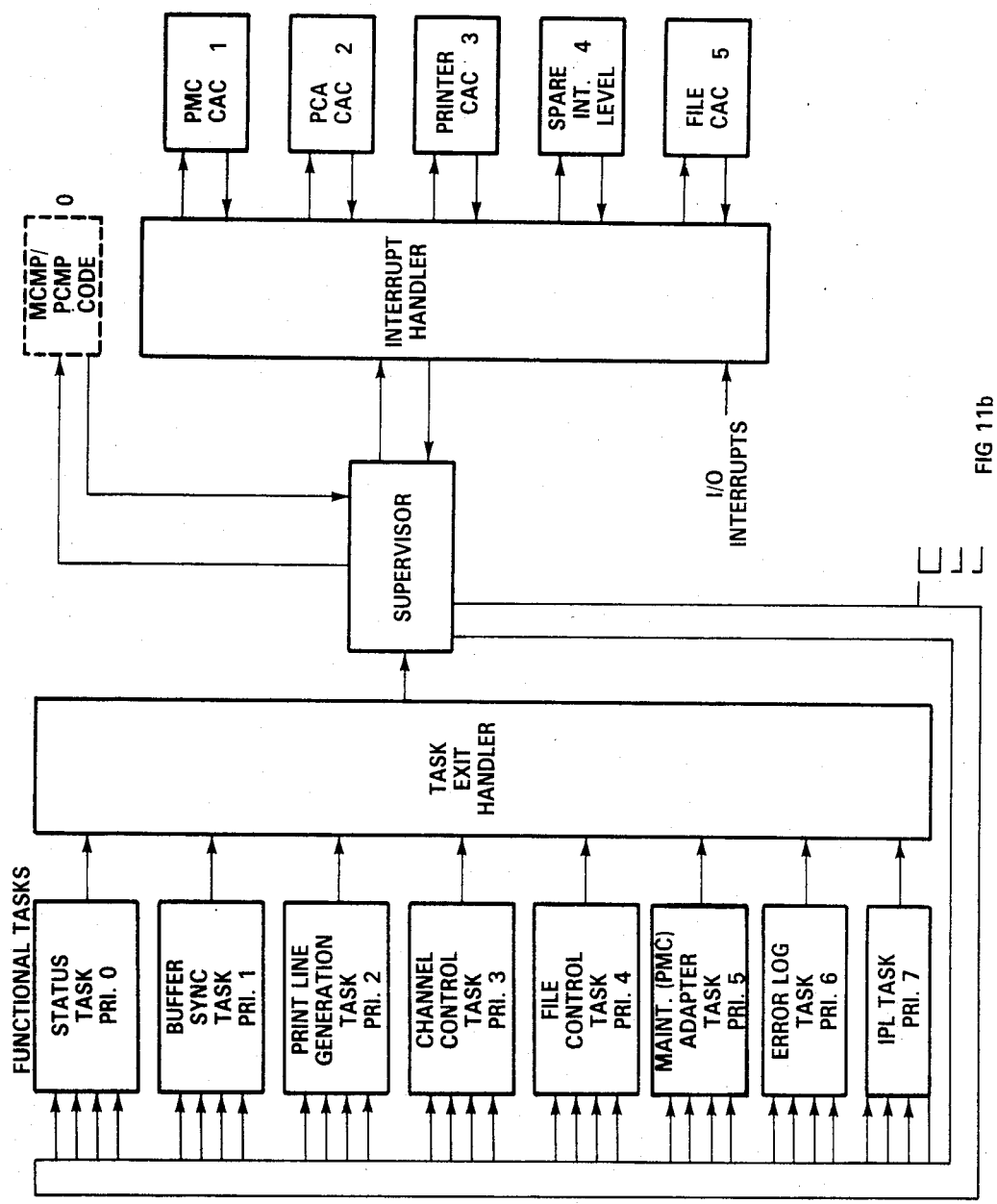

The control code is divided into three modules called interrupt handler, supervisor code and task exit handler. The interrupt handler controls all interrupt activity and level switching for levels 1-5. The interrupt handler is re-entrant and is the connecting link between the various CAC's and the level 6 supervisor program as shown in FIG. 11b. The interrupt handler is entered at its entry point whenever a PSW swap occurs for either hardware or software interrupts on levels 1-5. Supervisor code operates on level 6 and controls interrupts and level switching between level 6 and other level programs. This program receives the completion status queue from the interrupt handler and does preliminary decoding to separate attention operations, erroneous completion status or expected completion status. The supervisor establishes a path to the proper functional control module for further processing. Task exit handler operates on level 7 and is used by all eight tasks. It provides a path between the exiting task and the supervisor.

Functional code tasks. The functional code includes eight task modules that interface individually with the control code (FIG. 11b). The function code tasks for machine control are as follows:

Status task—maintains status and sense. Other tasks will give their input to the status task whenever they detect a change in printer status. This task has highest priority on level 7.

Buffer synch task—this the functional microcode that communicates with the printer CAC through the control code. It generates all the printer function requests and handles all the printer completions and attentions. Buffer synch receives it print line information for printing from the channel task and clears the appropriate page buffer area pointers when the page of information has been printed properly.

Channel control task—this is the microcode that communicates with the PCA CAC. Attentions are given to this task whenever the PCA accepts a channel control word from the host, detects a system reset, or switches state. Decodes each command analyzes data, checks data for validities and formats the data for printing. This data is placed in the print line buffer for printing.

File control task—is in the microcode that communicates with diskette file 18. It generates all the diskette function requests and handles all the completions and attentions from the file. Disketter 18 is for storage of program IPL data, initialization parameters (including speed control data), band image data, and diagnostics.

Product maintenance control task—divided into Base and Extended parts. The base microcode initializes the PMC CAC, handles display information for the panel alpha-numeric display and load the extended task when required for diagnostic mode. The extended microcode controls diagnostics operations.

IPL task—is the first code run after the bring-up diagnostics have run and have bottstrapped the initial block of operational code into PCMP 10 memory.

Common adapter code (CAC) microcode—this code has four parts which are interfaced by the control code as follows:

PCA and CAC—the channel attachment of the printer is via printer channel adapter 15 which provides the signal sequencing during all channel operations. This microcode controls the I/O initiation of these sequences as well as the inbound data associated with these sequences.

File adapter and CAC—the file common subadapter will be used without change to hardware or microcode.

Printer adapter and CAC—this maintains the ready/not ready status of the printer adapter. The status of the operator panel keys is debounced by MCMP 11 and entered into shared store 21. The printer CAC monitors these status bits and performs the necessary functions. This CAC controls operator lights via shared store 21 and MCMP 11 to display proper machine status. I/O commands are defined to communicate between the CAC microcode and the hardware and MCMP 11. These commands are used to transfer the print buffer and spacing information to the print adapter and MCMP 11. This CAC uses these commands to set up the adapter to print a line. A single line may contain up to 168 characters.

Product maintenance control and CAC—this is the interface between the PMC and the product maintenance control task.

Print Data Flow—the PCA CAC communicates through the PCA adapter and transfers the data into the main storage of PCMP 10. It then turns the command and data over to the channel control task. The latter analyzes each byte of data while checking for printable character code and performs the appropriate dualing and/of folding operations. The character data is saved in the internal print data storage to be used by the printer CAC under the control of the Buffer synch task. The channel is then given a device end signal through the PCA CAC.

The data is then transferred to the printer via the printer CAC under control of the buffer synch task. The buffer sync code controls the printing by providing a print block address to the printer CAC each time a line is to be printed. Buffer synch also updates the necessary control bits to free up storage area to be used for successive buffers.

The Mechanical Control Microprocessor (MCMP) 11 -this is used as part of the adapter hardware. The functions performed by MCMP 11 are debouncing of the switches and control lines and transfer of the status to shared store 21, carriage 28, stacker 31, and update of op panel lights. The op panel lights are updated based on the data placed in shared store 21 by the printer adapter CAC. The alpha-numeric displays are controlled directly by the product maintenance control 40 and does not require MCMP 11 operation for update.

MCMP 11 monitors the state of the switches by means of a free running five msec interrupt which is generated by a programmable timer circuit TSI. The state of the various detection switches in the print adapter is sensed by MCMP 11 and placed in the sensed bits in shared store 21 for sensing by PCMP 10. The op panel switches are debounced and the state of these switches is placed in shared store 21. Error conditions are detected and PCMP 10 notified of the problems by Adapter Error Interrupt.

The hammer fire logic in print control 12 will recognize the adapter go command as the signal that all data is available for print operation. The operation of hammer unit 13 will then take place based on data contained in the print line buffer, the band image buffer and the flight time compensation registers in print control 12 all of which have been loaded by PCMP 10 via PIO bus 14, BBA 19, and BBA bus 20 under control of the Printer CAC microcode prior to the adapter go command.

Hammer fire control of print control 12 will cause an interrupt to be generated in MCMP 11 to begin the carriage move operation. MCMP 11 will sense the top of the stack, stacking errors, and the limits of the stacker tray movement using a combination of hardware and microcode. The status of the stacker tray sense switches in shared store 21 is updated periodically by MCMP 11. A tray control routine is executed every 50 ms in PCMP 10. This routine causes stacker motor drive to be turned off via a control bit placed in shared store 21 which is used by MCMP 11 to control the stacker controls to shut off the stacker motor.

Thus, it will be seen that a printer system has been provided that is capable of operating at very high speeds and which can operate at multiple speeds without the requirement of replacing or redesigning the controls.

While the invention has been particularly shown and described with reference to a preferred embodiment thereof, it will be understood by those skilled in the art that the foregoing and other changes in form may be made therein without departing from the spirit and scope of the invention.

We claim:

1. A line printer including means for moving a paper web along a defined path, means for moving an endless type set at constant speed along a print line across said paper web, means for moving an ink ribbon along a defined path between said type carrier and said paper, a hammer bank comprised of a plurality of print hammers arranged in a row parallel with said print line each hammer being operable for recording lines of data from said type set on said paper web, and a control system responsive to a source of externally supplied data for operating said means for moving said paper web, said endless type set, said ink ribbon and for operating said print hammers in timed relation with the constant speed of said type set whereby lines of data are printed on said paper web comprising:

read/write memory means including print control and mechanical control buffers;

first processor means coupled to said read/write memory means including means responsive to data supplied by said external source for supplying print data to said print control buffers for operating said print hammers and mechanical control data to said mechanical control buffer for controlling said means for moving said paper web, said ink ribbon and for moving said endless type set at said constant speed; and second processor means coupled to said mechanical control buffer and operable in response to mechanical control data stored in said mechanical control buffer by said first processor means for controlling the operation of said means for moving said paper web, said ink ribbon, and said endless type set.

2. A line printer in accordance with claim 1 in which:

said first processor means includes means for supplying speed control data to said mechanical control buffer; and said second processor means is operable for changing the speed of movement of said endless type set in response to said speed control data supplied to said mechanical control buffer.

3. In a subsystem comprising a printer controlled by a host data processing system, the improvement comprising:

a first subsystem processor for receiving print and control data from said host system for operating said printer;

storage means accessible by said first processor for storing speed control data for operating said printer at a plurality of different speeds;

a second subsystem processor operative in response to said control data and said speed control data supplied by said first processor from said storage means for controlling the print speed of said printer; and speed selection means for communicating speed selection signals to said first processor to effect changes in the printing speed of said printer.

4. In a subsystem in accordance with claim 3 in which:

said speed selection means comprises user operated keyboard means coupled to said first processor and is user operable for supplying speed selection signals to said first processor.

5. In a subsystem in accordance with claim 4 in which said keyboard means is associated with said printer means.

6. In a subsystem in accordance with claim 4, in which:

said keyboard means includes user operated key members for supplying a speed selection signal preceded by a stop signal to said first processor; and said first processor is operable in response to said stop and speed selection signals for supplying stop control and speed control data to said second processor for stopping and then operating said printer at said selected speed.

7. In a subsystem in accordance with claim 3 in which:

said speed selection means is associated with said host system.

8. A printer system interconnectable to an external data source such as a host data processing system for receipt of print and control information for printing lines of data and having a printer mechanism with a plurality of mechanical devices for revolving an endless set of type relative to a row of print hammers, for feeding paper and an ink bearing medium relative to said set of type and a control means for operating said mechanical devices and said print hammers to print lines of data from said external source comprising:

a mechanical control microprocessor for controlling the operation of said plurality of mechanical devices;

an electronic print control operable for operating said plurality of print hammers in synchronism with the motion of said set of type to effect printing of lines of data on said paper web; and a print control microprocessor coupled to said external data source, said mechanical microprocessor and said electronic print control;

said print control microprocessor being operative to periodically supply print and print control data to said electronic print control to thereby enable said electronic print control to operate independently of said print control microprocessor to operate said print hammers in synchronism with the motion of said set of type to print lines of data on said paper web and to supply mechanism control data to said mechanical control microprocessor for controlling the revolving of set of type, the feeding of said paper web in line increments relative to said set of type and the movement of said ink bearing medium relative to said set of type.

9. A printer in accordance with claim 8 which further includes:

storage means coupled for access by said print control microprocessor and operable for storing speed control data for a plurality of different revolving speeds of said of type; and said print control microprocessor is operable for selectively supplying said speed control data from said storage means to said mechanical control microprocessor for controlling the revolution of said set of type at different speeds relative to said print hammers whereby printing is achieved at different print speeds.

10. A printer system in accordance with claim 9 in which:

said storage means further stores print hammer timing data for controlling the operation of said print hammers for different revolving speeds of said set of type; and said print control microprocessor is operable for selectively supplying said timing data from said storage means to said electronic print control for operating said plurality of print hammers is synchronism with the motion of said set of type at said plurality of of different revolving speeds.

11. A printer system in accordance with claim 10 in which:

said storage means is a diskette storage device coupled to said print control microprocessor for storage and selective retrieval of said speed control data and said hammer timing data.

12. A printer system in accordance with claim 9 in which:

said system further includes user operated speed selection means for producing speed selection signals representing different print speeds of said printer mechanism; and said print control microprocessor is operable in response to said speed selection signals for selectively supplying said speed control data in said storage means to said mechanical control microprocessor for revolving said set of type at speeds corresponding to speed selection signals produced by said speed selection means.

13. A printer system in accordance with claim 10 in which:
said system further includes user operated speed selection means for producing speed selection signals representing different print speeds of said printer mechanism; and
said print control microprocessor is operable in response to said speed selection signals for selectively supplying said speed control data in said storage means to said mechanical control microprocessor for revolving said set of type at speeds corresponding to speed selection signals produced by said speed selection means and said hammer timing data to said electronic print control for operating said print hammer in synchronism with the motion of said set of type at said plurality of different revolving speeds.

14. A printer system in accordance with claim 12 in which:
said speed selection means comprises a keyboard device including a plurality of key elements operable for producing said speed selection signals.

15. A printer system in accordance with claim 14 in which:
said keys of said keyboard device are operable for producing low, medium and high speed signals.

16. A printer system in accordance with claim 14 in which:
said mechanical control microprocessor is operable for monitoring said keyboard device for determining the status of said keyboard device; and
said mechanical microprocessor is further operable in response to speed selection signals produced by said keyboard device for communicating with said print control microprocessor whereby said print control microprocessor supplies speed control data from said storage device to said mechanical control microprocessor for controlling the revolving speed of said set of type in accordance with said speed selection signals.

17. A printer system in accordance with claim 14 in which:
said mechanical control microprocessor is operable for monitoring said keyboard device for determining the status of said keyboard device; and
said mechanical microprocessor is further operable in response to speed selection signals produced by said keyboard device and for communicating with said print control microprocessor whereby said print control microprocessor supplies speed control data and hammer timing data from said storage device to said mechanical control microprocessor and said electronic print control for controlling the revolving speed of said set of type and the operation of said print hammers in synchronism with the motion of said set of type in accordance with said speed selection signals.

* * * * *